United States Patent
Hsieh et al.

(10) Patent No.: US 11,143,944 B2
(45) Date of Patent: Oct. 12, 2021

(54) PROJECTION DEVICE AND CALIBRATION METHOD THEREOF

(71) Applicant: Coretronic Corporation, Hsin-Chu (TW)

(72) Inventors: Ching-Feng Hsieh, Hsin-Chu (TW); Chih-Chen Chen, Hsin-Chu (TW); Hui-Chung Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/782,003

(22) Filed: Feb. 4, 2020

(65) Prior Publication Data
US 2021/0240065 A1 Aug. 5, 2021

(51) Int. Cl.
*G03B 21/20* (2006.01)
*G03B 21/00* (2006.01)

(52) U.S. Cl.
CPC ....... *G03B 21/2053* (2013.01); *G03B 21/008* (2013.01)

(58) Field of Classification Search
CPC .... G03B 21/008; G03B 21/28; G03B 21/145; G03B 21/147; G03B 21/2013; G03B 21/2033; G03B 21/2053; H04N 9/315; H04N 9/3155; H04N 9/3164; H04N 9/3182; H04N 9/3194
See application file for complete search history.

(56) References Cited

U.S. PATENT DOCUMENTS

| | | | | |
|---|---|---|---|---|
| 2009/0096994 A1* | 4/2009 | Smits | ..................... | G01B 11/14 353/30 |
| 2009/0147224 A1* | 6/2009 | Kurozuka | ............ | H04N 9/3129 353/98 |
| 2010/0195184 A1* | 8/2010 | Laino | ................. | G03B 21/2033 359/245 |
| 2010/0302515 A1* | 12/2010 | Plut | ...................... | H04N 9/3194 353/85 |
| 2011/0096301 A1* | 4/2011 | Koyama | ............ | G03B 21/2033 353/88 |

(Continued)

FOREIGN PATENT DOCUMENTS

| CN | 209356837 | 9/2019 |
|---|---|---|
| TW | I294988 | 3/2008 |
| TW | 201044883 | 12/2010 |

*Primary Examiner* — Sultan Chowdhury
(74) *Attorney, Agent, or Firm* — JCIPRNET

(57) ABSTRACT

A projection device includes a light source, an optical engine and a controller. The light source provides a light beam according to a setting current. The optical engine includes a light combining module, an imaging module and a projection lens. The light combining module receives the light beam to generate an illumination beam. The imaging module includes a prism, a digital micromirror device and a light sensor. The prism transmits a portion of the illumination beam to the light sensor. The digital micromirror device converts the other portion of the illumination light beam into an image beam. The light sensor disposed between the prism and the digital micromirror device receives the portion of the illumination beam to generate a brightness data. The projection lens projects the image beam. The controller dynamically adjusts the setting current to calibrate a color point of the light beam according to the brightness data.

16 Claims, 3 Drawing Sheets

(56) References Cited

U.S. PATENT DOCUMENTS

2013/0070208 A1\* 3/2013 Nakanishi .......... G03B 21/2033
  353/31
2015/0286123 A1\* 10/2015 Tanaka ................. H04N 9/3105
  353/31

\* cited by examiner

PROJECTION DEVICE AND CALIBRATION METHOD THEREOF

BACKGROUND

Technical Field

The disclosure relates to a projection device, and more specifically, relates to a projection device with a color point calibration of a white image.

Description of Related Art

The projector with color point calibration of a white image is widely spread. In general, an optical engine in the conventional projector has a built-in light sensor. The light sensor receives red, green, and blue light sources to provide brightness data to a controller by a pulse-count electrical signal. The controller refers to ex-factory data of the projector to calculate setting values of the red, green, and blue light sources which match color points of a white image. Even the brightness of the light source is attenuated after using for a long period, and the color point could be maintained through the calibration function.

The optical engine of the conventional projector is divided into a light combining module, an illumination module, and an imaging module. In the conventional technology, the light sensor is generally disposed in the light combining module or the illumination module of the optical engine, rather than the imaging module due to reflected light generated by an digital micromirror device (DMD) in the optical engine when the digital micromirror device is turned off.

However, if the light sensor is disposed in the light-combining module or the illumination module, the plastic lenses in the light-combining module or the illumination module would be turned yellow due to long time use, leading to the stray light changed, so as to cause a difference between the pulse-count electrical signal and the ex-factory data. It results in a failure of the color point calibration function, thereby leading to color point shifting.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

Accordingly, the present disclosure is directed to a projection device with a light sensor and a calibration method thereof. The light sensor is disposed between a prism and a digital micromirror device in an imaging module of optical engine of the projection device, in order to avoid a failure of color point calibration function so as to cause color point shifting due to long-time use of plastic lenses in the light-combining module or the illumination module turned yellow.

In one of the exemplary embodiments, the present disclosure is directed to a projection device which would include, but not limited to, a light source, an optical engine and a controller. The light source is configured to provide a light beam according to a setting current. The optical engine is configured to receive the light beam, which the optical engine has a light combining module, an imaging module and a projection lens. The light combining module is configured to receive the light beam and generate an illumination beam. The imaging module includes a prism, a digital micromirror device and a light sensor. The prism is configured to receive the illumination beam and transmit a portion of the illumination beam to the light sensor. The digital micromirror device is configured to receive the other portion of the illumination beam transmitted from the prism and convert the other portion of the illumination light beam into an image beam. The light sensor is disposed between the prism and the digital micromirror device, and the light sensor receives the portion of the illumination beam transmitted from the prism to generate a brightness data. The projection lens is configured to receive the image beam transmitted from the digital micromirror device and project the image beam out of the projection device to form an image. The controller is coupled to the light sensor and the light source, and configured to receive the brightness data. The controller dynamically adjusts the setting current to calibrate a color point of the light beam emitted from the light source according to the brightness data.

In one of the exemplary embodiments, the present disclosure is directed to a calibration method adapted for a projection device. The projection device includes a light source, an optical engine and a controller. The light source is configured to provide a light beam. The optical engine is configured to receive the light beam and includes a light combining module, an imaging module and a projection lens. The light combining module receives the light beam and generates an illumination beam. The imaging module includes a prism, a digital micromirror device and a light sensor. The prism is configured to receive the illumination beam. The calibration method includes: providing the light beam emitted from the light source according to a setting current; transmitting a portion of the illumination beam through the prism to the light sensor, and transmitting the other portion of the illumination beam through the prism to the digital micromirror device; sensing the portion of the illumination beam by the light sensor to generate a brightness data, and the light sensor is disposed between the prism and the digital micromirror device; dynamically adjusting the setting current to calibrate a color point of the light beam emitted from light source by the controller according to the brightness data.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
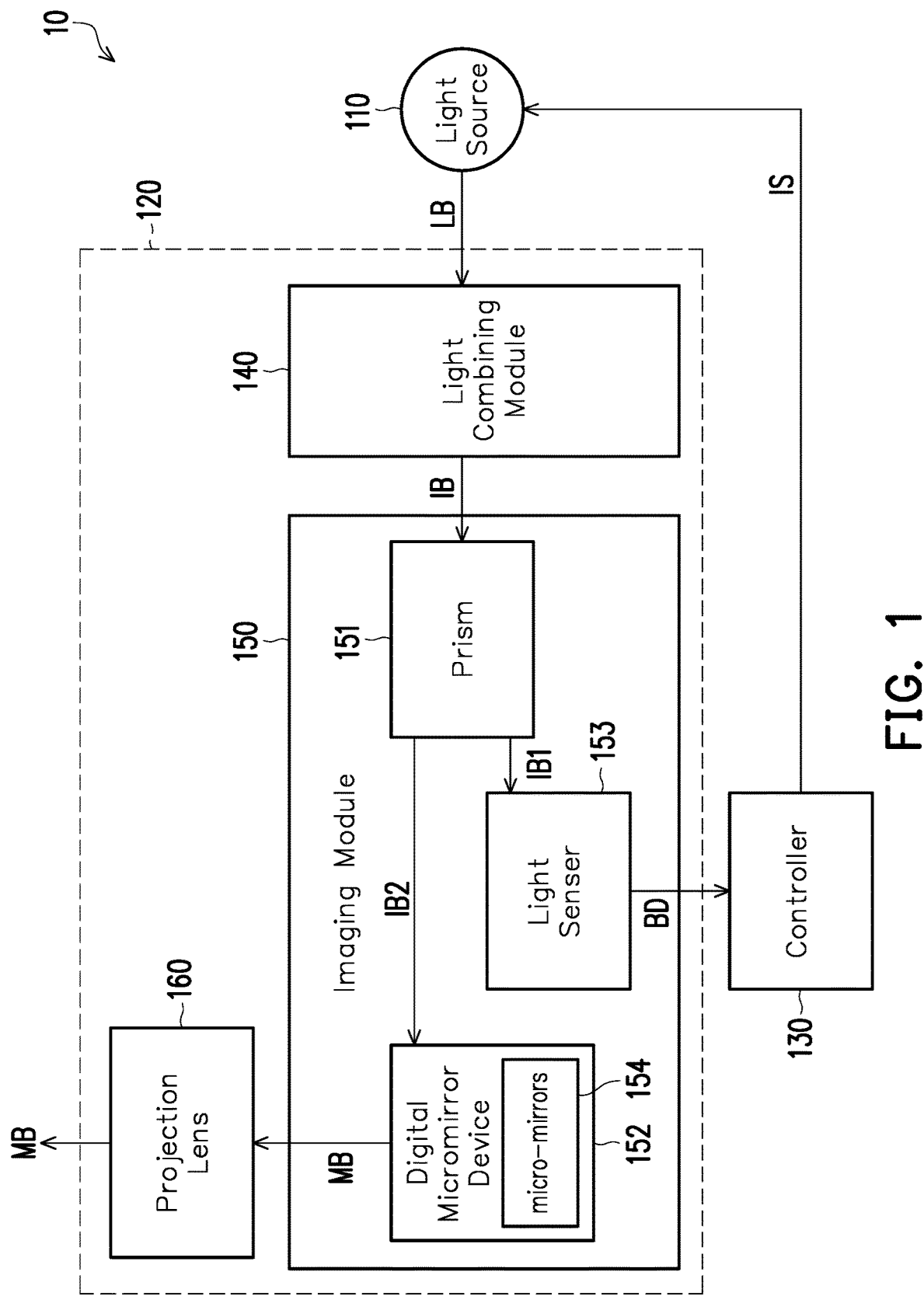
FIG. 1 is a schematic diagram illustrating a projection device according to an embodiment of the invention.

FIG. 1 shows a schematic diagram illustrating a projection device 10 according to an embodiment of the invention. Referring to FIG. 1, the projection device 10 includes a light source 110, an optical engine 120 and a controller 130, but not limited thereto.

The controller 130 is electrically coupled to the light source 110. The light source 110 provides a light beam LB according to a setting current IS transmitted from the controller 130, where the light source 110 may be a conventional lamp, a laser diode, an array of laser diodes, a LED or an array of LEDs, but not limited thereto.

The optical engine 120 is coupled to the light source 110, and receives the light beam LB transmitted from the light source 110. The optical engine 120 has a light combining module 140, an imaging module 150 and a projection lens 160, but not limited thereto. In some embodiments, the optical engine 120 may further include other circuits, for example, an illumination module disposed between the light combining module 140 and the imaging module 150. The light combining module 140 receives the light beam LB to generate an illumination beam IB. In some embodiments, the light combining module 140 is disposed on the transmission path from the light source 110 to the projection lens 160, and the light combining module 140 includes optical devices used to combine the red light, green light and blue light and optical devices used to uniform the light intensity. The imaging module 150 includes a prism 151, a digital micromirror device 152 and a light sensor 153. The prism 151 receives the illumination beam IB from the light combining module 140, transmits a portion of the illumination beam IB (namely illumination beam IB1) to the light sensor 153, and transmits the other portion of the illumination beam IB (namely illumination beam IB2) to the digital micromirror device 152. Specifically, the prism 151 is able to split illumination beam IB into the illumination beam IB1 and the illumination beam IB2 based on the structure of the prism 151, ex. the incident angle, and the index of refraction of materials. In some embodiments, the prism 151 may be a triangular prism, but not limited thereto. The digital micromirror device (DMD) 152 receives the illumination beam IB2 transmitted from the prism 151, and converts the illumination beam IB2 into an image beam MB. In detail, the digital micromirror device 152 includes a plurality of micromirrors 154, and each micro-mirrors 154 can be individually turned on or turned off so that the micro-mirrors 154 of the digital micromirror device 152 are able to jointly generate an image or a video. The light sensor 153 is disposed between the prism 151 and the digital micromirror device 152. The light sensor 153 receives the illumination beam IB1 transmitted from the prism 151, and generate an electrical signal called brightness data BD by detecting the brightness of the illumination beam IB1. The projection lens 160 receives the image beam MB transmitted from the digital micromirror device 152 and project the image beam MB out of the projection device 10 to form an image.

It is noted that the light sensor 153 is disposed between a prism and a digital micromirror device in an imaging module of optical engine of the projection device in order to avoid a failure of color point calibration, where the failure of color point calibration could cause color point shifting due to long-time use of plastic lenses turned yellow in the light-combining module or the illumination module.

The controller 130 is coupled to the light sensor 153 and the light source 110, and the controller 130 receives the brightness data BD and dynamically adjust the setting current IS to calibrate a color point of the light beam LB emitted from the light source 110 according to the brightness data BD. Specifically, the controller 130 compares the brightness data BD with a predetermined value PV to determine a setting current IS with an adequate value and provide the setting current IS to the light source 110. That is to say, the controller 130 could dynamically adjust the setting current IS to calibrate the color point of the light beam LB emitted from the light source 110 according to the comparison result. Furthermore, the controller 130 could record the setting current IS as a reference for a next calibration.

In one of the exemplary embodiments, the controller 130 could dynamically adjust the setting current IS providing to the light source 110 to calibrate the color point generated by the light beam LB emitted from the light source 110 only when all the micro-mirrors 154 of the digital micromirror device 152 are fully turned on. When all the micro-mirrors 154 of the digital micromirror device 152 are fully turned on, the color of the image is normally white so that the light sensor 153 could avoid to be affected by the reflected light generated by the digital micromirror device 152 (DMD off light) and various projection images.

Figure 2:
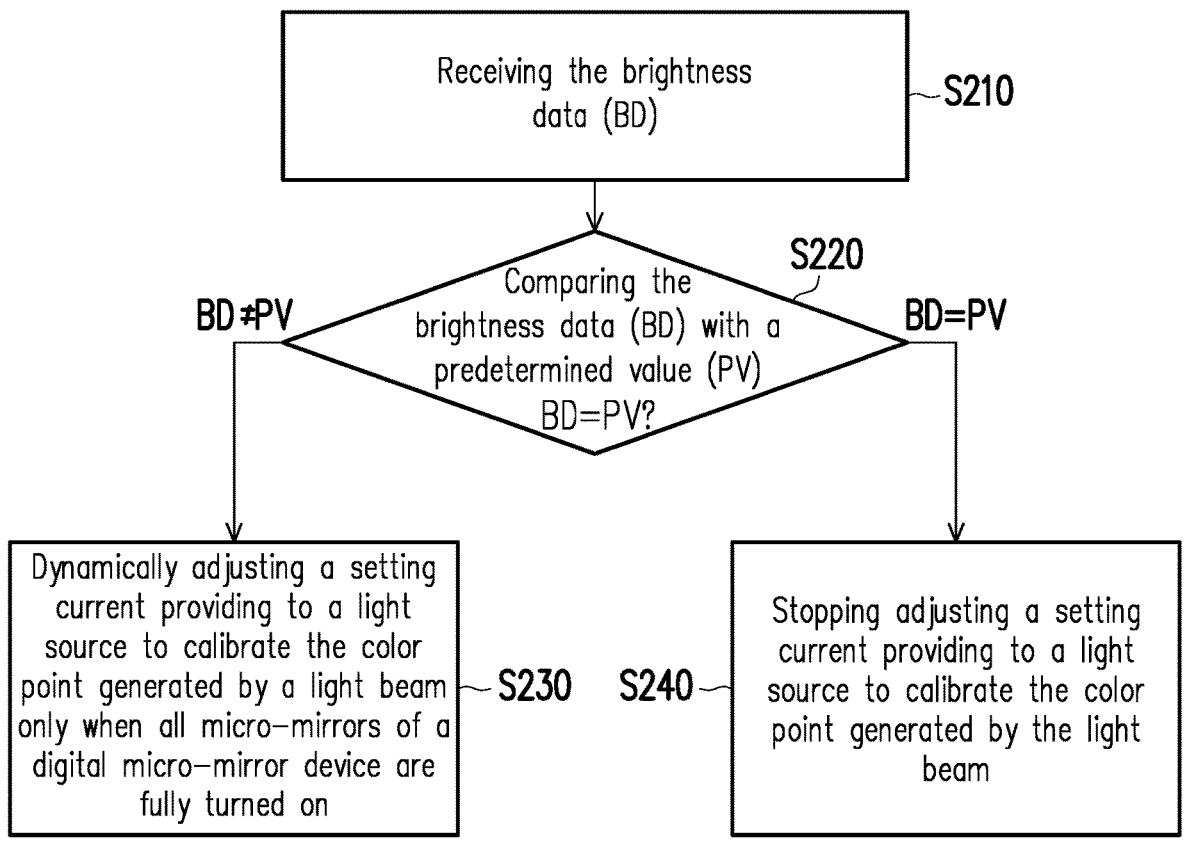
FIG. 2 is a flowchart illustrating a determination whether to dynamically adjust the setting current to calibrate the color point of the light beam according to an embodiment of the invention.

FIG. 2 shows a flowchart illustrating a determination whether to dynamically adjust the setting current to calibrate the color point of the light beam according to an embodiment of the invention. Referring to FIG. 2, in step S210, the controller 130 receives the brightness data (BD). In step S220, the controller 130 compares the brightness data BD with a predetermined value PV to determine whether the brightness data BD is equal to the predetermined value PV or not, where the predetermined value PV could be decided by a design requirement. And when the brightness data BD is not equal to the predetermined value PV, the controller 130 determines to enter the step S230. On the contrary, when the brightness data BD is equal to the predetermined value PV, the controller 130 determines to enter the step S240. In step S230, the controller 130 dynamically adjusts the setting current IS to calibrate the color point of the light beam LB emitted from the light source 110. In step S240, the controller 130 stops adjusting the setting current IS to calibrate the color point of the light beam LB emitted from the light source 110.

Regarding the adjustment timing, the controller 130 starts to adjust the setting current IS to calibrate the color point of the light beam IB emitted from the light source 110 only under some specific timing. The specific timing includes, for example, when the projection device 10 is activated for larger than a predetermined period and the brightness of the light beam LB emitted from the light source 110 varies within a predetermined range, when the projection device 10 is turned off, and when the projection device 10 is turned on manually by the user, but not limited thereto. Under above condition, the light sensor 153 could avoid to be affected by DMD off light and various projection images.

Specifically, the timing of the color point adjustment can be performed after the projection device 10 is turned on and the light source 110 has been stable, or after the user presses a power off button to adjust and record the setting current IS which the setting current IS could be entered in the next power-on, or when the projection device 10 is manually turned on by the user to perform the color point adjustment. On top of that, the timing of adjustment is not limited to only one time. For example, the light source 110 can be adjusted after the projection device 10 is turned on, and the user can manually turn on the function of the color point adjustment after the image is displayed for a period of time.

In addition, when a number of times the setting current IS dynamically adjusted is larger than a predetermined number and the brightness data BD is not equal to the predetermined value PV, the controller 130 stops adjusting the setting current IS to calibrate the color point of the light beam LB emitted from the light source 110. For example, when the setting current IS has been dynamically adjusted 11 times which is larger than 10 times as the predetermined number for an upper limitation, then the controller 130 could stop adjusting the setting current IS to calibrate the color point of the light beam LB, so as to avoid unstoppable adjustments.

Take an example for explaining the color point adjustment after the projection device 10 is turned on and the light source 110 is stabilized. When the projection device 10 is turned on for a period of time, for example, 1 to 5 minutes, a white image is projected and the color point adjustment is started. Later, the controller 130 would perform limited times of the color point adjustments on the setting current IS. For example, after providing the calculated setting current IS to the light source 110, the controller 130 would determine whether the brightness data BD received at this moment match the predetermine value PV. If the brightness data BD does not match the predetermine value PV, the color point adjustment would be performed again and the newly adjusted setting current IS would be provided to the light source 110. The color point adjustment would last about 2 to 5 seconds until the brightness data BD match the predetermine value PV. Afterwards, the color point adjustment will be ended, and the controller 130 will be switched to receive an external signal, rather than the brightness data BD. If the user does not manually enable the color point adjustment, the projection device 10 will not perform the color point adjustment until the projection device 10 is turned off. If the controller 130 calculates more than a predetermined times which means the color point cannot be tracked, the color point adjustment will be ended and the projection device 10 will return to a normal projection operation. The setting current IS at this moment will be the last setting current IS, and the failure result will be responded to the user. And when the projection device 10 is turned on next time, the color point adjustment will be performed again to adjust the setting current IS to match the predetermined value and provide it to the light source 110.

Furthermore, in some embodiments, when the light sensor 153 receives the illumination beam IB1 to generate the brightness data BD, the color of the image projected by the projection lens 160 can be red, green or blue.

Figure 3:
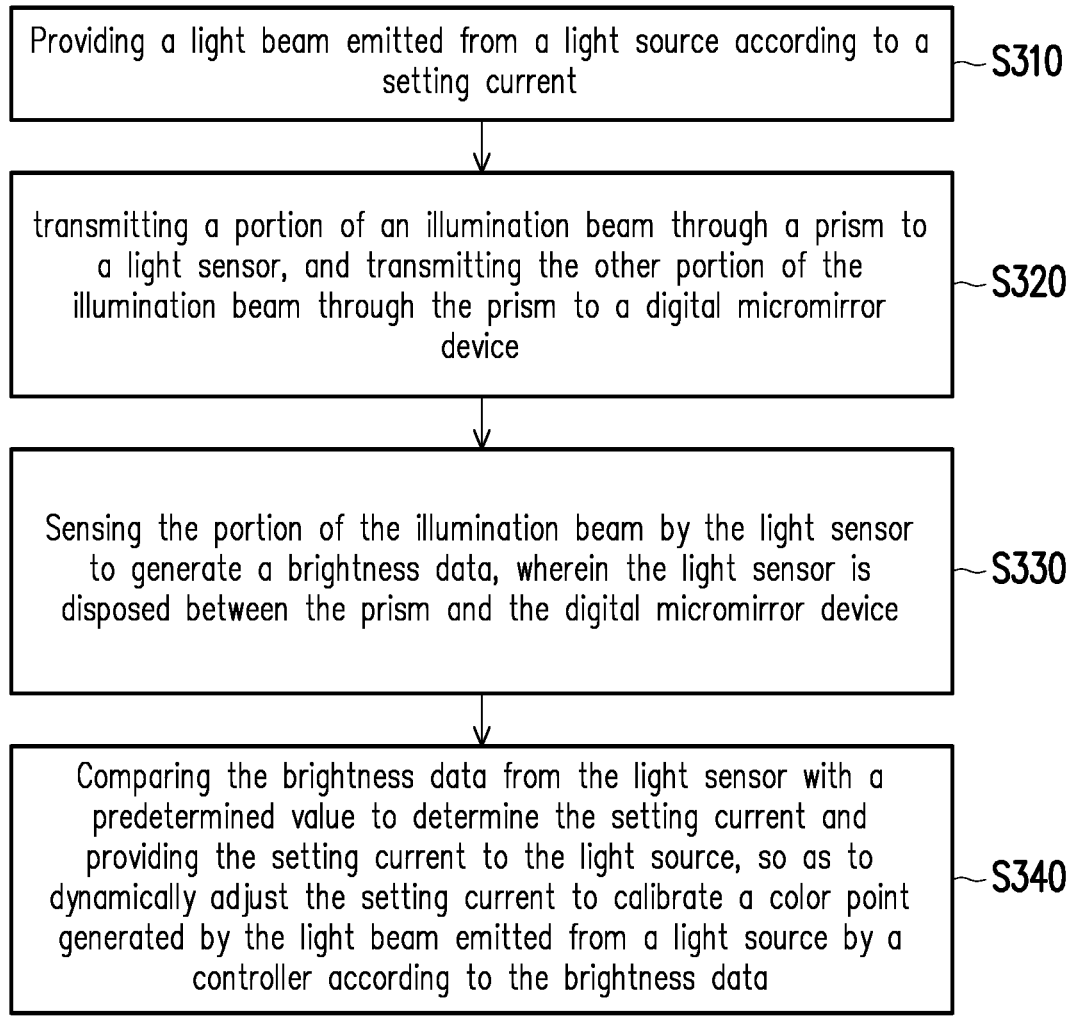
FIG. 3 is a flowchart illustrating a calibration method of the projection device according to an embodiment of the invention.

FIG. 3 shows a flowchart illustrating a calibration method of the projection device 10 according to an embodiment of the invention. Referring to FIG. 1 and FIG. 3, the calibration method includes steps as following. In S310, the light source 110 provides the light beam LB according to a setting current IS. In S320, the prism 151 transmits a portion of the illumination beam IB, namely illumination beam IB1, through the prism 151 to the light sensor 153, and transmits the other portion of the illumination beam IB, namely illumination beam IB2, through the prism 151 to the digital micromirror device 152. In S330, The light sensor 153 senses the illumination beam IB1 to generate a brightness data BD, where the light sensor 153 is disposed between the prism 151 and the digital micromirror device 152. In S340, the controller 130 dynamically adjusts the setting current IS to calibrate a color point of the light beam LB emitted from light source 110 according to the brightness data BD.

In summary, a novel projection device with a light sensor and a calibration method is proposed in exemplary embodiments. The light sensor is disposed between a prism and a digital micromirror device in an imaging module of optical engine of the projection device, so as to avoid a failure of color point calibration, which causes color point shifting due to long-time use of plastic lenses turned yellow in the light-combining module or the illumination module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A projection device, comprising:
a light source, configured to provide a light beam according to a setting current;
an optical engine, configured to receive the light beam, comprising a light combining module, an imaging module and a projection lens, wherein the light combining module is configured to receive the light beam and generate an illumination beam, the imaging module comprises: a prism, a digital micromirror device and a light sensor, wherein the prism is configured to receive the illumination beam and transmit a portion of the illumination beam to the light sensor, the digital micromirror device is configured to receive the other portion of the illumination beam transmitted from the prism and convert the other portion of the illumination light beam into an image beam, and the light sensor is disposed between the prism and the digital micromirror device, and the light sensor receives the portion of the illumination beam transmitted from the prism to generate a brightness data, and the projection lens is configured to receive the image beam transmitted from the digital micromirror device and project the image beam out of the projection device to form an image, and a controller, coupled to the light sensor and the light source, and configured to receive the brightness data, wherein the controller compares the brightness data from the light sensor with a predetermined value to determine the setting current, and provides the setting current to the light source, so as to dynamically adjust the setting current to calibrate a color point generated by the light beam emitted from the light source according to the brightness data.

2. The projection device as claimed in claim 1, wherein the digital micromirror device comprises a plurality of micro-mirrors, and the controller dynamically adjusts the setting current providing to the light source to calibrate the color point generated by the light beam emitted from the light source only when all the micro-mirrors are fully turned on.

3. The projection device as claimed in claim 2, wherein when all the micro-mirrors are fully turned on, a color of the image is normally white.

4. The projection device as claimed in claim 1, wherein
when the brightness data is not equal to the predetermined value, the controller dynamically adjusts the setting current providing to the light source to calibrate the color point generated by the light beam emitted from the light source, and when the brightness data is equal to the predetermined value, the controller stops adjusting the setting current providing to the light source to calibrate the color point generated by the light beam emitted from the light source.

5. The projection device as claimed in claim 1, wherein when a number of times the setting current dynamically adjusted is larger than a predetermined number and the brightness data is not equal to the predetermined value, the controller stops adjusting the setting current providing to the light source to calibrate the color point generated by the light beam emitted from the light source.

6. The projection device as claimed in claim 1, wherein the controller starts to adjust the setting current providing to the light source to calibrate the color point generated by the light beam emitted from the light source under a first condition, wherein the first condition comprises:
when the projection device is activated for larger than a preset period and the brightness of the light beam emitted from the light source varies within a preset range,
when the projection device is turned off, and
when the projection device is turned on manually.

7. The projection device as claimed in claim 1, wherein the controller records the setting current.

8. The projection device as claimed in claim 1, wherein a color of the image projected by the projection lens is red, green or blue when the light sensor receives the portion of the illumination beam to generate the brightness data.

9. A calibration method, adapted for a projection device, wherein the projection device comprises a light source, an optical engine and a controller, wherein the light source is configured to provide a light beam, the optical engine is configured to receive the light beam and comprises a light combining module, an imaging module and a projection lens, wherein light combining module receives the light beam and generates an illumination beam, the imaging module comprises a prism, a digital micromirror device and a light sensor, and the prism is configured to receive the illumination beam, the calibration method comprising:
providing the light beam emitted from the light source according to a setting current;
transmitting a portion of the illumination beam through the prism to the light sensor, and transmitting the other portion of the illumination beam through the prism to the digital micromirror device;
sensing the portion of the illumination beam by the light sensor to generate a brightness data, wherein the light sensor is disposed between the prism and the digital micromirror device; and
comparing the brightness data from the light sensor with a predetermined value to determine the setting current, and provides the setting current to the light source, so as to dynamically adjust the setting current to calibrate a color point generated by the light beam emitted from light source by the controller according to the brightness data.

10. The calibration method as claimed in claim 9, wherein the controller dynamically adjusts the setting current providing to the light source to calibrate the color point generated by the light beam emitted from the light source only when all of a plurality of the micromirrors of the digital micromirror device are fully turned on.

11. The calibration method as claimed in claim 10, wherein the digital micromirror device receives the other portion of the illumination beam transmitted from the prism and converts the other portion of the illumination beam into an image beam, the projection lens receives the image beam and projects the image beam out of the projection device to form an image, and when all the micromirrors are fully turned on, the image projected by the projection lens is normally white.

12. The calibration method as claimed in claim 9, wherein
when the brightness data is not equal to the predetermined value, the controller dynamically adjusts the setting current providing to the light source to calibrate the color point generated by the light beam emitted from the light source, and when the brightness data is equal to the predetermined value, the controller stops adjusting the setting current providing to the light source to calibrate the color point generated by the light beam emitted from the light source.

13. The calibration method as claimed in claim 9, wherein when a number of times the setting current dynamically adjusted is larger than a predetermined number and the brightness data is not equal to the predetermined value, the controller stops adjusting the setting current providing to the light source to calibrate the color point generated by the light beam emitted from the light source.

14. The calibration method as claimed in claim 9, wherein the controller starts to adjust the setting current providing to the light source to calibrate the color point generated by the light beam emitted from the light source under a first condition, wherein the first condition comprises:
 when the projection device is activated for larger than a preset period and the brightness of the light beam emitted from the light source varies within a preset range,
 when the projection device is turned off, and
 when the projection device is turned on manually.

15. The calibration method as claimed in claim 9, wherein the controller records the setting current.

16. The calibration method as claimed in claim 9, wherein the digital micromirror device receives the other portion of the illumination beam transmitted from the prism and converts the other portion of the illumination beam into an image beam, the projection lens receives the image beam and projects the image beam out of the projection device to form an image, and a color of the image is red, green or blue when the light sensor receives the portion of the illumination beam to generate the brightness data.

\* \* \* \* \*